(No Model.)

H. A. LOZIER.
WHEEL TIRE.

No. 498,667. Patented May 30, 1893.

Witnesses
Carroll J. Webster
Floyd R. Webster

Inventor
Henry A. Lozier
By his Attorney
William Webster

United States Patent Office.

HENRY A. LOZIER, OF CLEVELAND, OHIO.

WHEEL-TIRE.

SPECIFICATION forming part of Letters Patent No. 498,667, dated May 30, 1893.

Application filed October 27, 1892. Serial No. 450,174. (No model.)

*To all whom it may concern:*

Be it known that I, HENRY A. LOZIER, of Cleveland, county of Cuyahoga, and State of Ohio, have invented certain new and useful Improvements in Wheel-Tires; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to pneumatic tires for vehicle wheels, particularly that class of tires composed principally of an inflatable air tube lying upon the face of the wheel rim and securely covered and protected by an outer sheath or covering which is detachably secured to the rim.

The object of my invention is to provide improved means for securing the protective sheath to the wheel rim so that it may be readily removed to permit access to its interior for repairs of punctures, &c., either in the sheath or in the air tube within it; and it consists in the parts and combination of parts hereinafter described and specifically pointed out in the claims.

In carrying out my invention I form enlargements or flanges along the edges of the sheath; and on the wheel rim corresponding flanges or ledges which are engaged by the ledges on the sheath; and also other flanges or ledges on the rim against which the sheath abuts or bears like the fulcrum or resistance point of a lever, to force and hold the interlocking flanges of the sheath and rim in secure engagement which cannot be broken while the inner air tube is inflated under its normal working pressure, which may be anywhere from fifty to seventy-five pounds per square inch, more or less. The arrangement of the locking flanges and abutting ledges in the wheel rim is such that flange edges of the sheath can be inserted between them or withdrawn therefrom only from the inside of the rim and when the sheath is distorted and its side bent back to an unnatural position, leaning over toward the center of the rim, into which position it may be readily forced by pressure of the hand when the air tube is deflated.

The accompanying drawings show my improvements in the best form now known to me but the proportions and arrangement of parts might be varied by a skillful mechanic to a considerable extent from those therein shown without departing from the spirit of my invention as set forth in the claims in the end of this specification.

Figure 1:
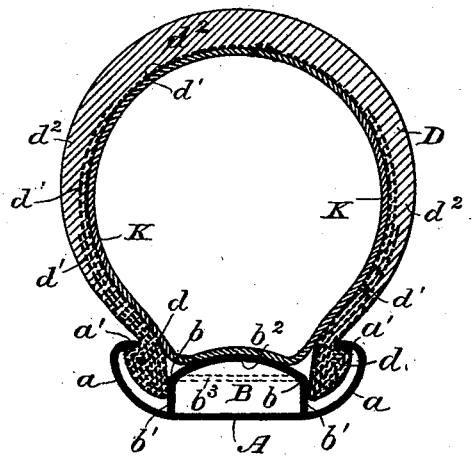
Figure 2:
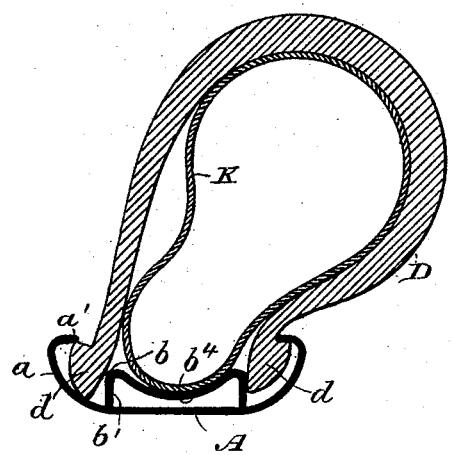
Figure 3:
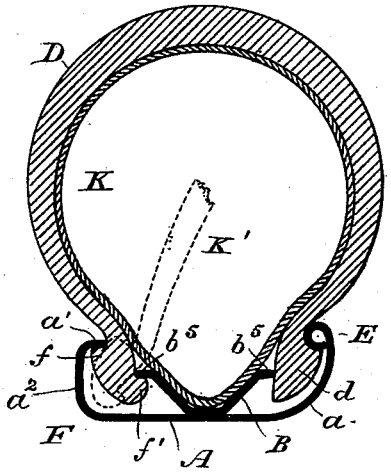
Figure 4:
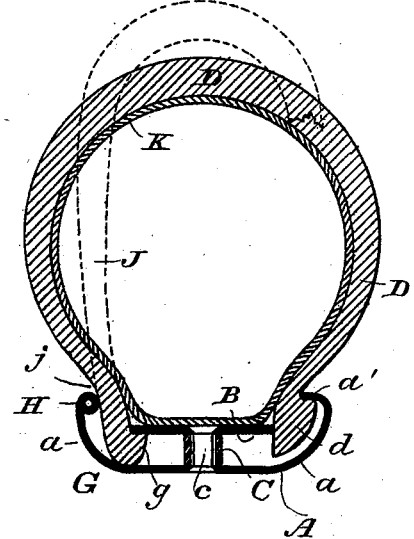

In the drawings Figure 1, is a transverse section through a wheel rim and pneumatic tire applied thereto in what I now consider the most desirable manner of applying my invention, the air tube being inflated and the sheath securely locked in its working position. Fig. 2, is a view of the parts generally similar to those in Fig. 1, and illustrates the method of inserting the flanged edge of the protective sheath, the air tube being deflated and the sheath forced into an unnatural position. Figs. 3 and 4, illustrate modifications in the details of my invention that will be hereinafter more fully described.

Referring particularly to Fig. 1, the rim A, it will be observed, is turned up at each side as at $a$, the upturned portions having at their tops inwardly projecting flanges $a'$. Within the rim is mounted a ring or plate B, of any desired form, in cross-section, narrower however, than the space between the adjacent edges of the rim flanges $a', a'$, and of a smaller diameter at its operative or working points $b, b,$ than said flanges $a', a'$. The location of these working points or corners of the ring B, relatively to the inner edges of the flanges $a'$, is the essential feature, and the sectional shape of the ring is immaterial so long as it does not interfere with the carrying out of my invention. In Fig. 1, this ring B, is shown as having vertical side legs or flanges $b'$, extending up to the points $b$, and connected by an arched crown $b^2$. This crown may, however, be flat as shown by the dotted lines $b^3$, or the arch may be inverted as shown at $b^4$, in Fig. 2. Instead of the ring B, being made in either or any of these forms it may be made as shown in Fig. 3, where its central portion is depressed and rests upon the face of the rim, its edges $b^5$, occupying the same relation to the edges of the flange $a'$, that the corners $b$, do in the other form. Again this rim B, may be made of a single flat strip as shown in Fig. 4, and held at suitable elevavation by spacing thimbles C, and rivets c. These rings B, may be brazed or otherwise secured to the rims if desired but I have found in practice that with such forms as are shown in Figs. 1, 2, and 3, it is not necessary to thus secure them to the rim. In Figs. 1, and 2, the flanges or ribs d, d, formed at the edges of the sheath D, are cut away or tapered on their sides to adapt them to fit the space formed by the curved, upturned edges of the rim; they might however, be made square or nearly so if the rim were so shaped as to provide space for this purpose, somewhat, for instance, like the square side $a^2$, of the rim shown in Fig. 3. These ledges are reinforced and greatly stiffened by numerous layers of canvas or other fabric $d'$, (shown by heavy dotted lines) which I use in the composition of the sheath in connection with the rubber body $d^2$, into which the layers of fabric are molded and thoroughly incorporated. The presence of these layers of fabric greatly strengthens the flanges and stiffens the whole lower edges of the sheath against flexure or bending, so that any pressure tending to expand the sheath above the rim or to force it sidewise will crowd the sheath flange into closer contact at its top with the flange on the rim, while the bottom of the sheath flange will press hard on its inner side against the rim B, so that it acts upon the principle of a lever in resisting any tendency to pull it out of engagement in this direction.

While I have shown the flanges of the sheath as being stiffened by numerous layers of fabric, they might be brought to the proper degree of stiffness by any other suitable means, such for instance, as vulcanization, the edges being made as much harder than the tread portion of the sheath as may be found desirable. While the fabric is shown in only one of the figures of the drawings, it will be understood that the flanged edges of the sheaths shown in the other figures are to be suitably treated.

Fig. 2, illustrates the method of inserting the edges of the sheath into the space in the rim adapted to receive it, which method, it is thought, will be clearly understood without further description than that already given. When the flanged edges of the sheath have been slipped into place in the rim, the air tube K, which with its nipple and valve is too well known in the art at this time to require minute description, is inflated and expands or rounds out the sheath as shown in Fig. 1.

At E, in Fig. 3, the rim is shown with a turned roll or bead at its upper edge instead of a horizontal flange like those in the preceding figures. At F, in the same figure, the lower edge of the sheath is shown provided with two ledges or flanges $f, f'$, resting beneath the flange $a'$, on the rim, and the flange $b^5$, of the ring B, respectively, thus forming a double lock involving the lever principle as before, the sheath edge being inserted into the space between the rim flanges and ledges from the position shown by the dotted lines K'. This gives additional security to the lock but I do not at present consider it absolutely essential for I have found in practice that sheaths having a single flange, interlocking on one side with a ledge or flange on the rim and abutting at its opposite side against another flange or contact point, is all sufficient to maintain the sheath firmly in place when the air tube is inflated.

In Fig. 4, at G, I illustrate another modification of my invention, the ledge $g$, in this case being formed on the inner side of the sheath and locking under the edge of the plate or inner ring B, while the outer side of the sheath bears against the upturned portion $a$, of the rim, which I prefer to form at its top with a roll or bead H, as shown. It might be preferable in all of these cases to mold the sheath into shapes like, or somewhat like that shown by dotted lines J, in Fig. 4, so that when it is slipped into place and the inner air tube inflated, the sides of the sheath would be spread or expanded and the bend J, formed at the point of contact with the bead H, or the flanges $a'$, thus producing a greater leverage between the upper, outer, and lower, inner points of contact of the sheath and rim and therefore a greater tendency to hold the interlocking flanges together.

What I now regard as the essential feature of my invention, consists in so arranging the locking flanges and contact points of the rim in different planes both horizontally and vertically that the flanged edges of the sheath must be forced between them from the inside of the rim while the air tube is deflated, and that when the air tube is inflated, and the sheath expanded laterally thereby, its interlocking flange is forced into firm contact with the corresponding flange of the rim at one side while its opposite side bears against the resistance ledge in the rim, thus forming a firm lever lock between the sheath and the rim which cannot become detached until the air tube is deflated.

I am aware that rubber tires have been fastened to rims by wire or other bands provided with tightening devices by which the bands may be caused to clamp the edges of the tire down onto the rim. In wheels of this character the lever lock which characterizes my invention is lacking. The band or wire clamping device requires loosening to release the tire, and the latter, whether deflated or inflated, is held by the clamp alone. In my wheel on the contrary the tire is secured to and released from the rim merely by inflating and deflating it; and there is no mechanical clamping device, distinct from the rim and tire which requires tightening and loosening for the purpose of fastening and releasing the tire.

Having thus described my invention, what I claim as new and useful, and desire to secure by Letters Patent, is—

1. In a wheel tire, the combination of a rim having locking flanges and contact points in different planes, both horizontally and vercally, and an inflatable sheath having flanged or enlarged edges inserted between the said locking flanges and contact points and there locked or released according as the sheath is inflated or deflated, substantially as and for the purposes hereinbefore set forth.

2. In a wheel tire, the combination of a rim having locking flanges and contact points in different planes both horizontally and vertically, a pneumatic tube, and a covering therefor having flanged or enlarged edges inserted between said locking flanges and contact points and there locked or released according as the pneumatic tube is inflated or deflated, substantially as and for the purposes herein before set forth.

In testimony that I claim the foregoing as my own I hereby affix my signature in presence of two witnesses.

HENRY A. LOZIER.

Witnesses:
WM. A. SKINKLE,
CORNELIA A. SKINKLE.